United States Patent [19]
McNaney

[11] 3,985,428
[45] Oct. 12, 1976

[54] LIGHT OPTIC DATA HANDLING SYSTEM

[76] Inventor: Joseph T. McNaney, 8548 Boulder Drive, La Mesa, Calif. 92041

[22] Filed: June 25, 1975

[21] Appl. No.: 590,105

[52] U.S. Cl. .......................... 350/160 R; 332/7.51; 340/173 LM
[51] Int. Cl.² .......................................... G02B 5/23
[58] Field of Search ............. 350/96 WG, 160, 161, 350/162; 356/112; 332/7.51; 340/173 LM

[56] References Cited
UNITED STATES PATENTS

| | | | |
|---|---|---|---|
| 3,498,693 | 3/1970 | Fein et al. .......................... | 350/160 |
| 3,506,334 | 4/1970 | Korpel .............................. | 350/162 |
| 3,923,380 | 12/1975 | Hattori et al. ..................... | 332/7.51 |

*Primary Examiner*—David C. Nelms

[57] ABSTRACT

The system herein includes light optic means which functions as a secondary light beam deflector, or distributor, in making available informational arrays of initially positioned light beams, from a primary light beam deflector, at any of a number of secondary display positions for the purpose of extending the deflection and resolution capabilities beyond the practical limits of the primary beam deflector.

1 Claim, 4 Drawing Figures

LIGHT OPTIC DATA HANDLING SYSTEM

BACKGROUND OF THE INVENTION

The invention herein relates to light optic data handling systems which utilize the concept, as set forth in my U.S. Pat. No. 3,872,451, of directing a beam of light by means of an array of at least three light reflecting surfaces along a primary optical path in the form of a spiral of plural revolutions. At a predetermined location along each revolution the beam of light will be made available for a redirecting of light therefrom along a corresponding one of a plurality of secondary paths stemming, respectively, from said locations, each location representative of an output position of said system. Electro optic material light reflection control means are included at each output position for effecting, selectively, a frustrating of light reflection and thereupon redirecting light away from a selected one of the output positions.

In a co-pending application Ser. No. 566,916 filed Apr. 10, 1975, a further embodiment of an electro optic material light reflection control means is disclosed including the use of a layer of electro optic material in combination with an interdigital electrode assembly joined to the surface thereof at each of the output positions. In response to a d.c. voltage between first and second electrodes of the assembly periodic strains are established in the layer of material and resulting periodic variations of index of refraction therein are utilized in the controlling and redirecting of light along a secondary path stemming from a selected one of a plurality of output positions.

In another co-pending applicaion Ser. No. 580,586 filed May 27, 1975, the material coincident with the light reflection control interface at each output position exhibits piezoelectric effects in response to the influence of an electric field. Interdigital electrode assemblies are supported closely adjacent the interface at each output position and in response to a d.c. voltage between the electrodes of a given assembly the resulting periodic strains in the piezoelectric material, followed by a spatial change in the index of refraction of materials coincident with the interface thereof, effects a redirecting of light away from a corresponding one of the output positions.

Herein the light beam deflection control concept of the above noted U.S. Pat. No. 3,872,451 is again utilized, but in combination with an initial beam positioning means for allowing a single source beam of light to be directed along a plurality of individual input paths to the system.

SUMMARY OF THE INVENTION

An array of information bearing light beams are directed either serially or simultaneously along input paths toward a light admitting surface of the secondary light beam deflector, or light beam distributor. Upon entering the distributor each light beam of the array is directed along a primary optical path therein stemming, respectively, from each of the input paths. In following a primary path each beam of an array undergoes a series of light reflections for the purpose of making available light thereof at any of a number of light output positions of the distributor. Utilizing electrical control means at each of the output positions an array of information bearing light beams is thereupon directed along secondary paths beyond the limits of the distributor for use in data handling, communications, or for control purposes. It is therefore an object of the invention to extend the resolution and deflection capabilities far beyond those of present day acousto-optic and electro-optic beam positioning means.

The invention is illustrated, by way of example only, in the accompanying drawing, and the description which follows when read in connection with the drawing will provide a better understanding of the above object and still other advantages of the invention.

DESCRIPTION OF THE INVENTION

Figure 1:
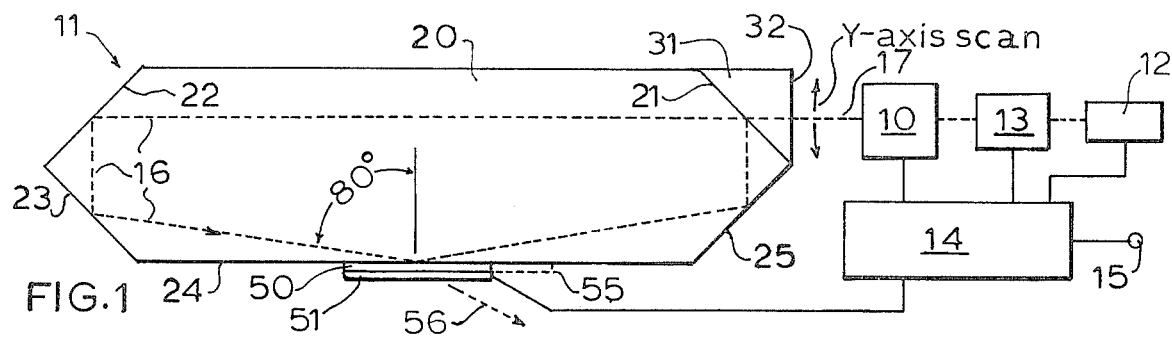
FIGS. 1 and 2 are first and second diagrammatic presentations of a system embodiment of the invention.
Figure 2:
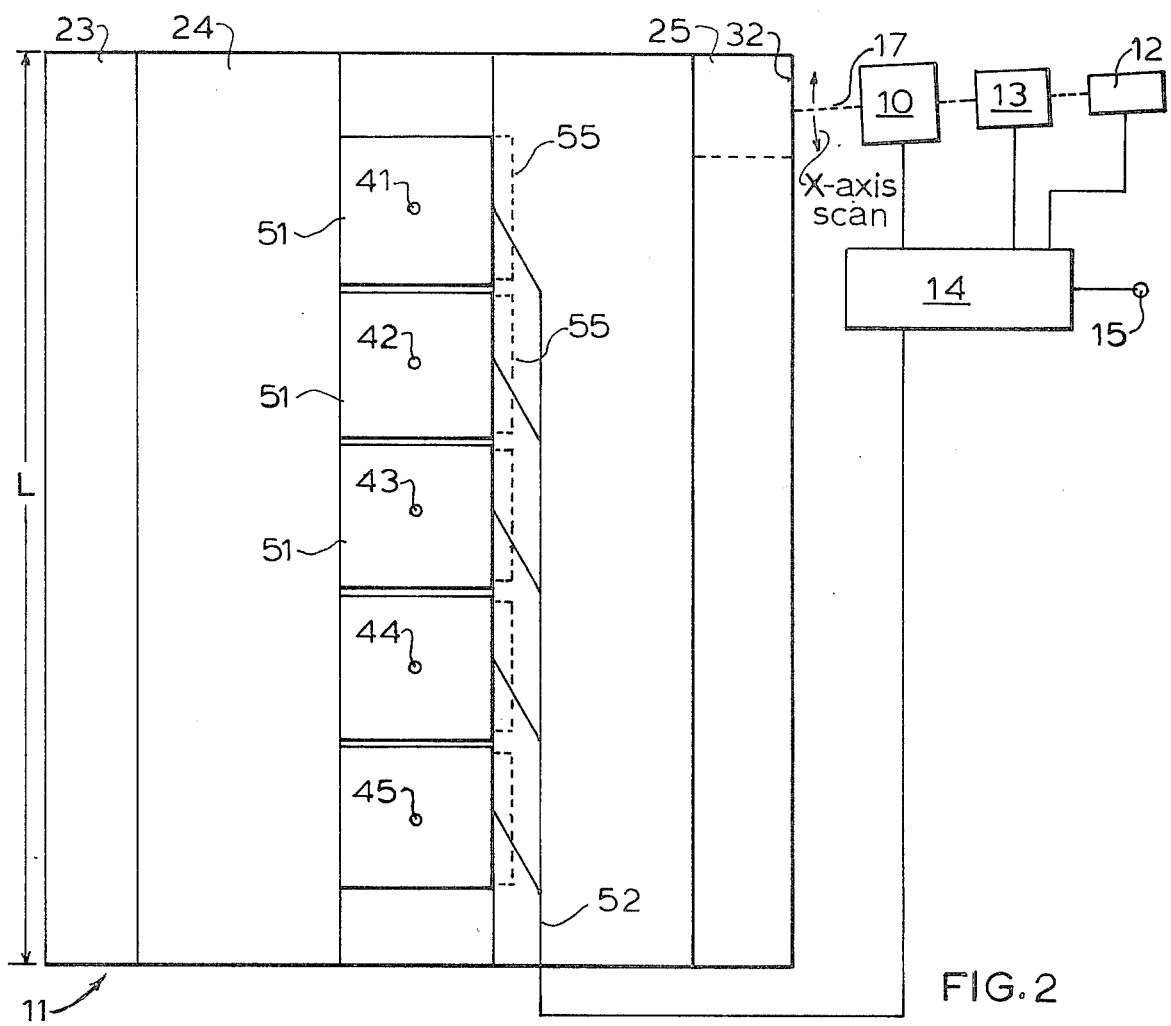

Referring now to FIGS. 1 and 2, the light optic data handling system invention hereof is illustrated, for example, as including a first light beam deflection, or positioning, means 10 and a second light beam deflection, or distributor, means 11. The first beam positioning means 10 is a block diagram illustration of an acousto-optic device, for example, positioned in the optical path of light from a laser light source 12 and a light beam modulator 13, each of which are of the type well known in the industry. In response to the influence of electrical signals from control logic circuitry 14, and signals applied to an input terminal 15, the modulator 13 will control the intensity of the light from the source 12 and the device will control the deflection of the light beam in either an X-axis mode or in a Y-axis mode, or both.

The distributor 11 is illustrated as being, for example, a solid member 20 of light conducting material presenting a predetermined index of refraction and having a length dimension L. Closely adjacent to one side 21, and at one end thereof, there is shown a prism 31 preferably of a material like that of the member 20. Light from the source 12 may be understood as being directed along a normal, or mid-position, path 17, and at an angle in relation to the member 20 as indicated in FIG. 2. It should, of course, be understood that all dimension of the illustrations are somewhat exaggerated so as to simplify descriptions of the invention. Upon the entry of a light beam to the member 20 it will be directed along a path therein, which will be referred to as the primary optical path 16, by means of light reflecting surfaces, or interfaces of first and second light conducting material, 22, 23, 24 and 25, and then again by surfaces 21, 22, 23, and so on, spiralling its way through the length dimension L of the member 20, thereby following a series of 360° optical paths each displaced one with respect to the other in a side-by-side relationship therein. The object is to allow the beam to appear at a series of deflection points, or output positions, 41, 42, 43, 45, etc., along the deflection surface 24 of the member 20 in the direction of its length dimension L. The angular relationship of the reflecting surfaces 21, 22, 23, 24 and 25 has been established so as to provide an angle of incidence of 80° for the light beam incident upon the reflecting surface 24. Although this is close to a preferred angle of incidence the design is not to be limited in this regard.

A layer 50 of a light conducting dielectric material is intimately joined to the surface 24 along the length dimension L, having a thickness dimension of 1-micron, more or less, and presenting an index of refraction lower than that of the member 20 material to the extent of providing an index differential which satisfy the deflection control requirements of light beams incident upon the surface 24 at any desired angle. An electrode structure 51 is deposited on the layer 50 at each of the output positions 41, 42, 43, etc., each being coupled to the control circuitry 14 through a set of appropriate connecting leads 52.

The layer 50 can be a material selected from a wide variety of Kerr effect or Pockels effect materials in either a solid, liquid, gas or colloidal state, or one of a variety of ferroelectric ceramic materials, or one of a variety of clear light conducting piezoelectric materials. Either these or still other materials may be considered which are capable of responding to the application of an electric field thereto so as to modify an otherwise normal index of refraction differential at the interface of member 20 and layer 50 materials.

Figure 4:
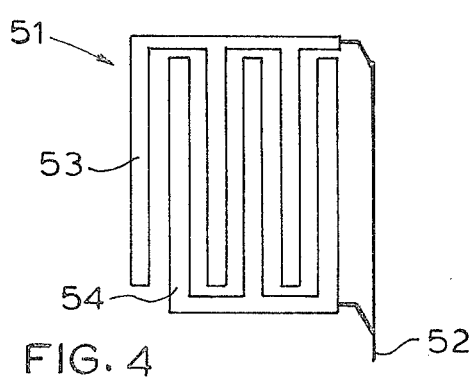
FIG. 4 is a more detailed diagrammatic showing of the electrode structure being referred to in FIGS. 1 and 2.

The electrode structure 51 is further exemplified in FIG. 4 as being an interdigital type structure having first and second sets of fingers 53 and 54, which may be, for example, a deposition of tin oxide material on the surface of the material 50. In spiralling its way through the length of member 20 the light beam undergoes a series of reflections until it reaches the opposite end thereof. However, upon the application of a voltage between the fingers 53 and 54 at any one of the output positions 41, 42, 43, etc., the electric field produced thereby will effect a change in the index of refraction of the layer 50 and a modification in the index differential at the interface of materials 20 and 50 to the extent of frustrating an otherwise normal light reflection thereat permitting light to be directed through the interface and beyond the limits thereof and along a secondary path 56.

Figure 3:
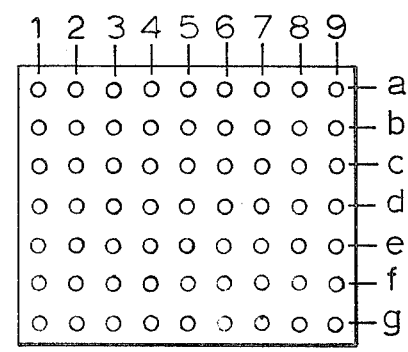
FIG. 3 will be referred to in the following description of the system embodiment of the invention.

Referring now to FIG. 3, a 7 × 9 array of circled areas is illustrated to represent an array of light beam positions at which light beams may be made to appear at the input surface 32 of the distributor 11 by means of the deflecting device 10 and modulator 13 in response to signals applied thereto. In the absence of such signals the mid-position path 17 when referring to FIG. 3 may be further identified as position 5-d, and a light beam stemming from such position at the surface 32 may be directed along a path 56 from any of the output positions 41, 42, etc., having a voltage extended to the electrode structure 51 thereof. Also, light beams stemming from the 7 × 9 array of positions at the surface 32 may be directed along a 7 × 9 array of paths 56 stemming from a selected one of the output positions. In such manner a great variety of message characters may be formed using this 7 × 9 array and made available for a directing along secondary paths so as to form messages at the output of the distributor 11, for recordings thereof, as an example, Utilizing as many as 100 output positions, as a further example, to record 100 message characters per line across a record medium represents an extension of the length dimension L of the distributor 11 to accommodate the additional output positions. From the standpoint of resolution such recording may be equal to 1,000 elements per line across the medium. However, for higher quality recording of message characters resolution capabilities must be at least 10,000 elements per line across the medium, which is about 10 times the resolution capabilities of the most advanced acoustooptic light beam deflection devices. Meeting the 10,000 elements per line across the record medium is, of course, an objective of the present invention.

The above method of recording is referred to as the dot-matrix recording approach. For high quality recording, however, the facsimile mode is preferred wherein media transport provides Y-axis motion and the X-axis deflector 10 in series with the distributor 11 will provide the horizontal scan of the laser 12 beam across a record medium. Theoretically, a 10-output position distributor 11 having an X-scan acousto-optic device 10 provide 1,000 elements per line light beam information incident upon the surface 32 will suffice in providing a 10,000 element per line resolution for high quality recording purposes. In this manner the invention herein increases the resolution capabilities of the device 10 by a factor of 10. The utilization of a 20-output position distributor 11 is preferred, having an X-scan acousto-optic device 10 provide 500 elements per line light beam information incident upon surface 32.

Referring again to the layer 50 and electrode 51 assembly, the use of a clear light conducting piezoelectric material as layer 50 will permit periodic strains to be established therein upon the application of a voltage to the electrode fingers 53 and 54 and, simultaneously, periodic variations in the index of refraction of the layer 50, serving as a diffraction grating for frustrating light reflections at the interface of this layer and the member 20 material. Or, the member 20 may be of a clear light conducting material and layer 50 being a thin layer of light conducting glass through which the periodic strains will be extended to the member 20 surface 24 in achieving light reflection control. Piezoelectric materials may be selected from such materials as quartz, tourmaline, barium titanate, lithium niobate, or like materials.

Instead of utilizing an electrode structure 51 as illustrated in establishing periodic strains in the layer 50, a piezoelectric material supported adjacent each of the output surfaces, as indicated by dotted lines 55 in the system illustrations, may serve as a transducer for generating acoustic waves in the medium of member 20, or in a layer of glass 50, so as to act as phase gratings in the achieving of light reflection control.

It should be understood by those skilled in the arts pertaining to the construction and application possibilities of the invention herein set forth that the embodiments included herein illustrate in a very limited sense the usefulness of the invention, and that the invention includes such other modifications and equivalents as may be seen by those skilled in the arts, but still being within the scope of the appended claims.

I claim:

1. A light optic data handling system, comprising:
   a. a source of light and means for directing an individual beam of light therefrom along, at least, first or second input paths to said system and thereupon along a corresponding one of first or second primary optical paths within said system so as to establish an availability of light of said beam at a plurality of predetermined locations along said primary optical paths for a redirecting of light from a selected one of said locations to, and along, a corresponding one of a plurality of secondary optical paths stemming, respectively, from said locations, each said location representative of an output position of said system;

b. said means including an array of at least three light reflecting surfaces each surface presenting a length dimension and each surface positioned substantially parallel one with respect to the other in said array, the surfaces of said array each angularly oriented so as to establish an optical relationship one with respect to the other for allowing said beam of light to be directed along either of said primary paths each forming a helix of plural revolutions, each revolution including at least one of said predetermined locations representative of an output position at which light will be made available for said redirecting thereof along a corresponding secondary path;

c. first and second light conducting media intimately adjacent to one another and thereby providing a light reflecting interface thereof, said interface extending along said length dimension and representative of at least one of the light reflecting surfaces of said array of surfaces, each of said output positions coinciding with, and extending along the length dimension of, said interface of the first and second light conducting media;

d. a plurality of light reflection control means each operatively associated with the media of said light reflecting interface along said length dimension thereof adjacent, respectively, said output positions;

e. a source of electrical signals and control circuitry means for extending, selectively, the influence of said electrical signals to said light reflection control means;

f. means for allowing said beam of light to be directed along either of said primary optical paths in the absence of said influence to any of said light reflection control means;

g. means for limiting the redirecting of light, selectively, from but one of said locations along one or the other of said primary optical paths at any one time, said last stated means including the extending of said influence to a light reflection control means adjacent a selected one of said output positions for establishing a spatially varying change in the index of refraction of at least one of said first and second media coinciding with said selected one of the output positions and for thereby establishing a diffraction grating in said medium for effecting said redirecting of light along a secondary path stemming from said selected one of said output positions.

* * * * *